July 20, 1926.
F. V. TISCHER
1,593,200
LAMINATED STRUCTURE AND METHOD OF PRODUCING IT
Filed Feb. 17, 1923    2 Sheets-Sheet 1
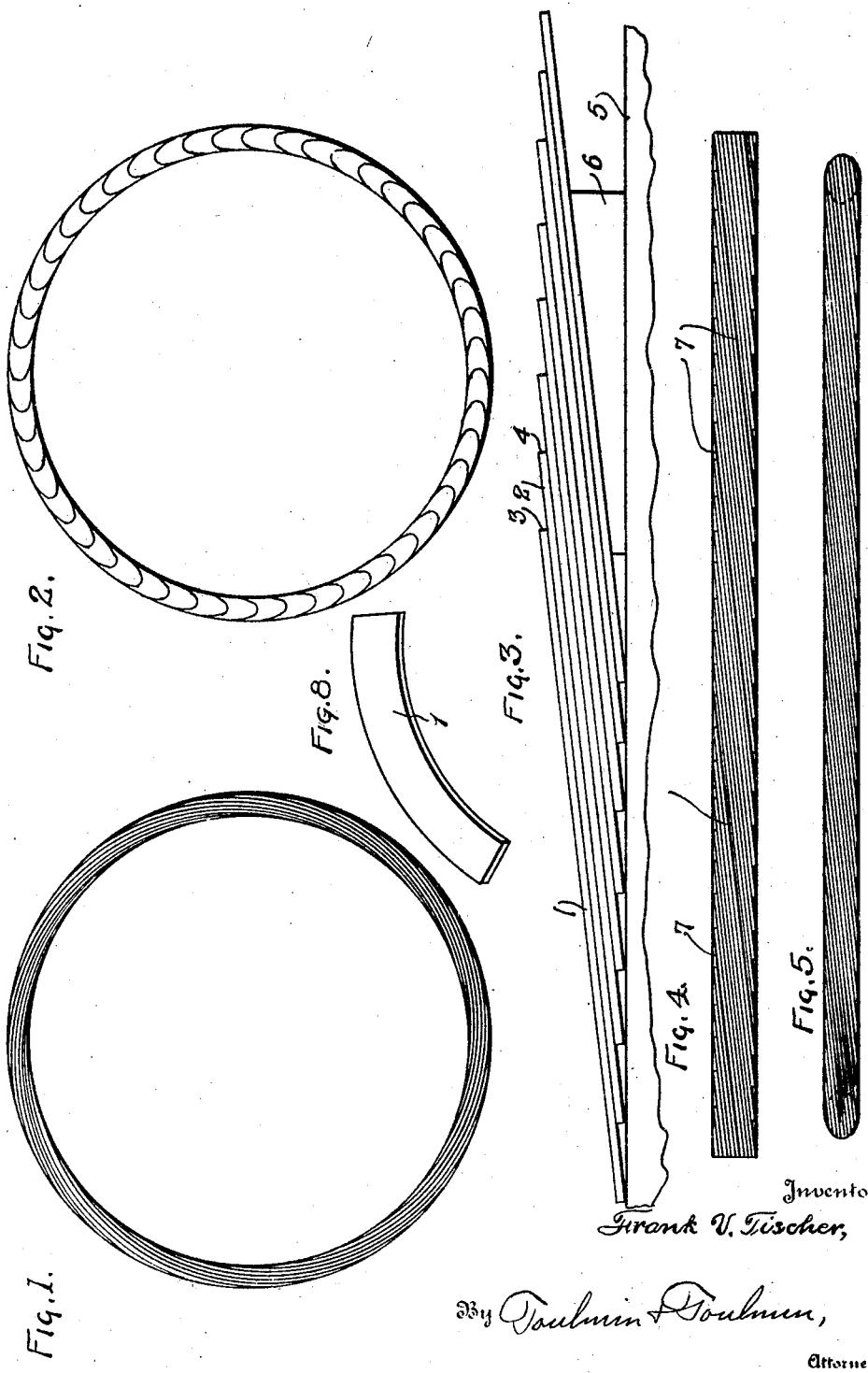
Inventor
Frank V. Tischer,
By Toulmin & Toulmin,
Attorneys

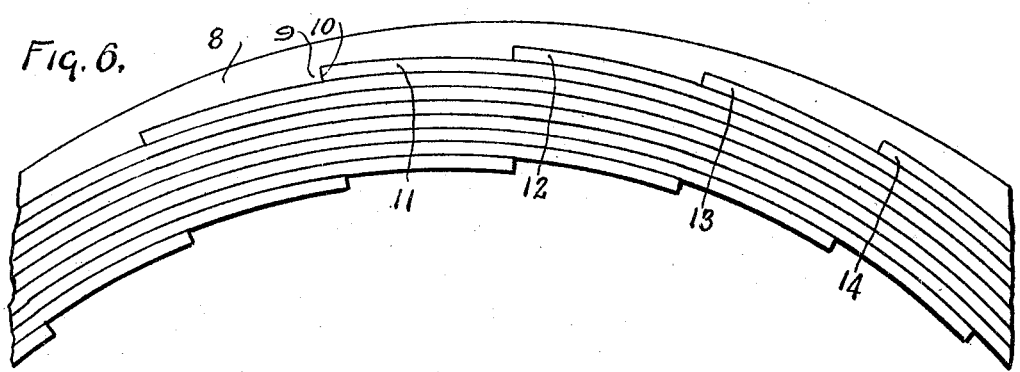
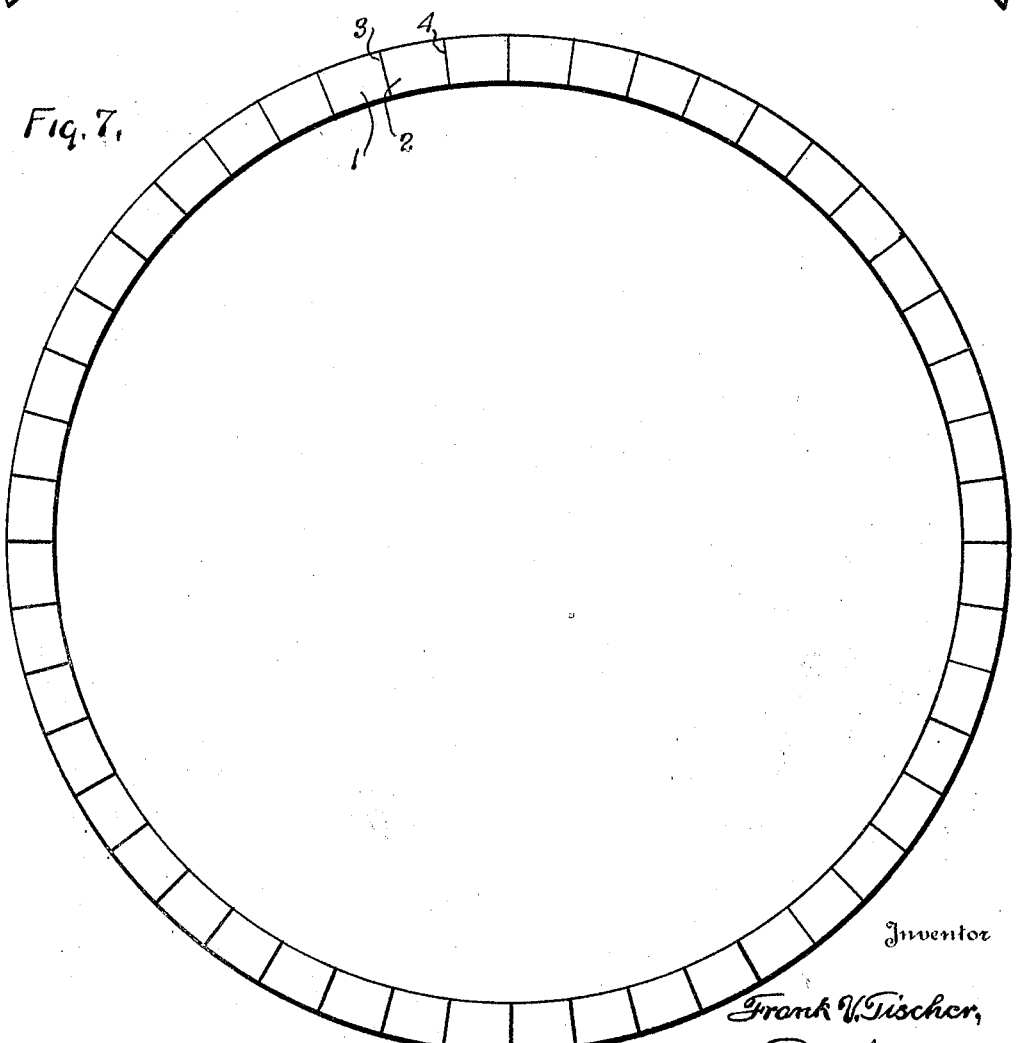

Patented July 20, 1926.

1,593,200

UNITED STATES PATENT OFFICE.

FRANK V. TISCHER, OF DAYTON, OHIO.

LAMINATED STRUCTURE AND METHOD OF PRODUCING IT.

Application filed February 17, 1923. Serial No. 619,719.

My invention relates to laminated structures and a method of producing them.

The object of my invention is to provide laminated structures of great strength, durability, and beauty, built of very short lengths of laminations which may be assembled individually or in groups to form structures of predetermined character and size.

It is a further object to provide such a laminated structure so that no end joint will be over another joint.

It is my object to provide all joints being overlapped by a solid structure.

It is a further object to provide the disposition of units composing the laminated structure at an angle to the axis of major stress securing a structure of great strength and rigidity.

It is a further object to provide means of forming annular structures or laminated structures which are curved in various configurations.

Particularly, it is my object to provide from short cheap pieces of laminated material annular structures such as steering wheels for automotive vehicles in which great strength is required as well as a smooth surface and an attractive appearance.

Referring to the drawings:

Figure 1 illustrates a steering wheel built up of a series of laminations arranged in planes parallel to the vertical axis of the wheel.

Fig. 2 illustrates a steering wheel built up of a plurality of laminations arranged in the same plane as the wheel and at right angles to the vertical axis of the wheel.

Fig. 3 is an enlarged view of one of the units assembly of the laminations preferably employed in building up the steering wheel shown in Fig. 2.

Fig. 4 is a side elevation of a complete, assembled group of laminations forming the steering wheel shown in Fig. 2 before the wood has been turned down to form the completed steering wheel shown in Fig. 5.

Fig. 5 is a side elevation of the completed steering wheel.

Fig. 6 is a section enlarged showing the arrangement of the laminations within a retaining ring which laminations are to form a steering wheel shown in Fig. 1.

Fig. 7 is a plan view of the laminations arranged in completed form to form the steering wheel prior to being turned to form a completed wheel.

Fig. 8 is a detail view of one of the curved laminations of which the wheel shown in Fig. 2 is built up.

Referring to the drawings in detail:

1 designates a lamination disposed at an angle to the horizontal upon another like lamination 2, but having its end 3 spaced from the end 4 of the lamination 2. The same is true of each of the laminations which are spaced at an angle through a horizontal plane and are spaced one behind the other at equal distances. In building up such a laminated structure I provide a table 5 and a block 6 for supporting one end of the laminated structure until it is built. If the structure is an annular one as in Fig. 2 then the other end will be built up to take the place of the block 6. I find it advantageous to build up these laminated structures in groups such as in Fig. 3, then to assemble them as in Fig. 4. The dark dividing lines 7 in Fig. 4 indicate the divisions lines between units. This arrangement is not essential but it is a matter of advantage in assembling such structures. It will be understood that it is preferable to have each of the laminations cut out to form a portion of the annular member so that there are a series of segments being assembled one upon the other in laminated form. It is preferable to glue the laminations to one another and to exert pressure upon them so that they will firmly engage. I then place the completed structure in a lathe and turn it to the desired form with the result that the joints between the laminations give the steering wheel the appearance of a grain like the strands of a rope resulting in a finish of great beauty strength and durability. It will be observed that the laminations are disposed at an angle to the horizontal plane and therefore lend great strength to the structure.

In the other form of my invention I provide an annular member or ring such as 8 having a series of stepped portions inwardly extending as at 9 with the ends 10 against which laminations 11, 12, 13 14, and the like abut in succession. It will be observed that these projections 9 are at their ends of a depth of a single lamination and provide for the positioning of the laminations relative to one another in stepped relation with overlapping joints. In this instance the laminations are parallel to the main axis of the wheel to be formed. They are glued to one another in succession and when finally removed from the ring they are placed in the lathe and turned up.

The interior of this ring, therefore, is laid off in a series of volutes forming the shoulders 9 of the maximum depth of a single lamination and tapering to infinity to the base of the next succeeding shoulder of the next volute. The successive laminations are accordingly laid off on successive volutes.

It will be understood that I do not desire to confine myself to the details of my invention, but comprehend within it suitable and necessary modifications.

Having thus fully described my invention, what I claim as new and desire to secure by Letters Patent, is:—

1. In a method of forming a laminated structure for use as a steering wheel, selecting a plurality of laminations, arranging said laminations in stepped relationship with respect to one another, said laminations being tilted at an angle to a horizontal plane which is the plane of the wheel and arranged with their faces partially overlapping one another.

2. In a method of forming a laminated structure for use as a steering wheel, selecting a plurality of relatively short curved laminations, arranging said laminations in stepped overlapping relationship with respect to one another, said laminations being tilted to a horizontal plane which is the plane of the wheel, fastening said laminations so that they cannot move with respect to one another, and arranging said laminations so that they form a circular body.

3. In a laminated structure for use as a steering wheel, a plurality of relatively short laminations arranged in stepped relationship to one another, each of said laminations being partially exposed and arranged so that the laminations are tilted at an angle to a horizontal plane which is the plane of the wheel.

In testimony whereof, I affix my signature.

FRANK V. TISCHER.